United States Patent
Silverstein et al.

(10) Patent No.: US 7,643,062 B2
(45) Date of Patent: Jan. 5, 2010

(54) METHOD AND SYSTEM FOR DEBLURRING AN IMAGE BASED ON MOTION TRACKING

(75) Inventors: D. Amnon Silverstein, Mountain View, CA (US); Suk Hwan Lim, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 724 days.

(21) Appl. No.: 11/148,985

(22) Filed: Jun. 8, 2005

(65) Prior Publication Data

US 2006/0279639 A1 Dec. 14, 2006

(51) Int. Cl.
*H04N 5/228* (2006.01)
(52) U.S. Cl. .................. 348/208.4; 348/208.99; 348/208.2; 348/208.5; 348/208.7
(58) Field of Classification Search .............. 348/208.7, 348/208.5, 208.99, 208.2, 208.4; 396/53
See application file for complete search history.

(56) References Cited

U.S. PATENT DOCUMENTS

| | | | | |
|---|---|---|---|---|
| 4,612,575 A | * | 9/1986 | Ishman et al. | 348/208.4 |
| 5,155,520 A | * | 10/1992 | Nagasaki et al. | 396/53 |
| 6,130,709 A | * | 10/2000 | Sekine et al. | 348/208.8 |
| 6,888,566 B2 | * | 5/2005 | Larkin et al. | 348/208.4 |
| 7,239,342 B2 | * | 7/2007 | Kingetsu et al. | 348/208.4 |
| 2005/0168585 A1 | * | 8/2005 | Uenaka et al. | 348/208.99 |
| 2006/0119710 A1 | * | 6/2006 | Ben-Ezra et al. | 348/208.99 |

* cited by examiner

*Primary Examiner*—Sinh Tran
*Assistant Examiner*—Paul Berardesca

(57) ABSTRACT

A method and system for deblurring an image based on motion tracking. light is recorded at an image sensor of an imaging device to capture an image. motion of said image sensor is recorded at a motion sensor of the imaging device during the recording of the light at the image sensor. A blur kernel is generated based on the motion.

22 Claims, 5 Drawing Sheets

METHOD AND SYSTEM FOR DEBLURRING AN IMAGE BASED ON MOTION TRACKING

TECHNICAL FIELD

Embodiments of the present invention relate to the field of digital imaging. More specifically, embodiments of the present invention relate to a method and system for deblurring an image based on motion tracking.

BACKGROUND ART

Digital imaging devices, such as digital cameras, allow users to take photographs and store them in digital form. In general, digital imaging devices capture images by exposing an image sensor, such as a Charged Coupled Device (CCD), to a scene for a particular exposure time. As digital imaging technology advances, CCDs are able to capture images with greater resolution. The spatial resolution of a digital camera refers to the number of pixels included in a captured image. For example, a three-megapixel digital camera takes an image that is divided into three million pixels. As the pixel size decreases, it is increasingly important to ensure that each pixel is exposed to a sufficient amount of light to capture the image. For instance, the exposure time may be increased to ensure that each pixel captures enough light.

In general, typical digital imaging devices do not have enough sensitivity to capture images in many low light situations. For example, a user may wish to take photos in a museum or at a performance. In many of these cases, the user is not permitted to use a flash when taking the picture. Typically, the digital imaging device will set a very long exposure time (e.g., several seconds) to ensure that enough light is captured. However, the digital imaging device typically captures motion blurred images because the user cannot hold the imaging device steady enough during the course of the exposure. Furthermore, the subject of the photo may also move during the exposure, further blurring the captured image.

Some digital imaging devices also provide users with telephoto options to zoom in on a scene, enabling the capture of a closer version of the scene. As the zoom factor for capturing an image increases, the exposure time can be proportionally shortened. However, as the pixel sizes decreases in higher resolution imaging devices, the exposure time may not be proportionally shortened or shortened at all, to ensure that enough light is captured.

In general, there is a trade-off between shorter exposure images and longer exposure images. A short exposure image is typically sharp, as there is little motion blur. However, short exposure images are also typically noisy, as the signal-to-noise-ratio is low for underexposed pixels. Signal-to-noise-ratio decreases as the pixels in the image sensors receive less photons and short exposure images may not receive sufficient photons to ensure high signal-to-noise-ratio. In contrast, a long exposure image is well exposed and less noisy. However, as described above, long exposure images are subject to motion blur, resulting in blurred images.

In the prior art, motion stabilization of the image sensor is used to account for motion blur. Motion stabilization typically involves the image sensor being located on mechanical actuators that are controlled by a stabilizer circuit. If the imaging device moves, e.g., the photographer's hands shake, the actuators move the image sensor in the opposite direction, stabilizing the image sensor. Keeping the image sensor stabilized for the duration of the exposure reduces motion blur.

Motion stabilization using actuators is only effective for a small range of motion, due to the mechanical limits of typical actuators. Motion stabilization also places several limitations on imaging device. For instance, the mechanical actuators and stabilizer circuits are typically costly components. Moreover, they require substantial power to drive the actuators. The heat generated by the actuators also influences the image sensor, having an adverse effect on the quality of the captured images. Furthermore, due to the size of the actuators, there is a limit to the minimum size of the imaging device.

DISCLOSURE OF THE INVENTION

Various embodiments of the present invention, a method and system for deblurring an image based on motion tracking, are described herein. Light is recorded at an image sensor of an imaging device to capture an image. Motion of said image sensor is recorded at a motion sensor of the imaging device during the recording of the light at the image sensor. A blur kernel is generated based on the motion.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

Figure 1:
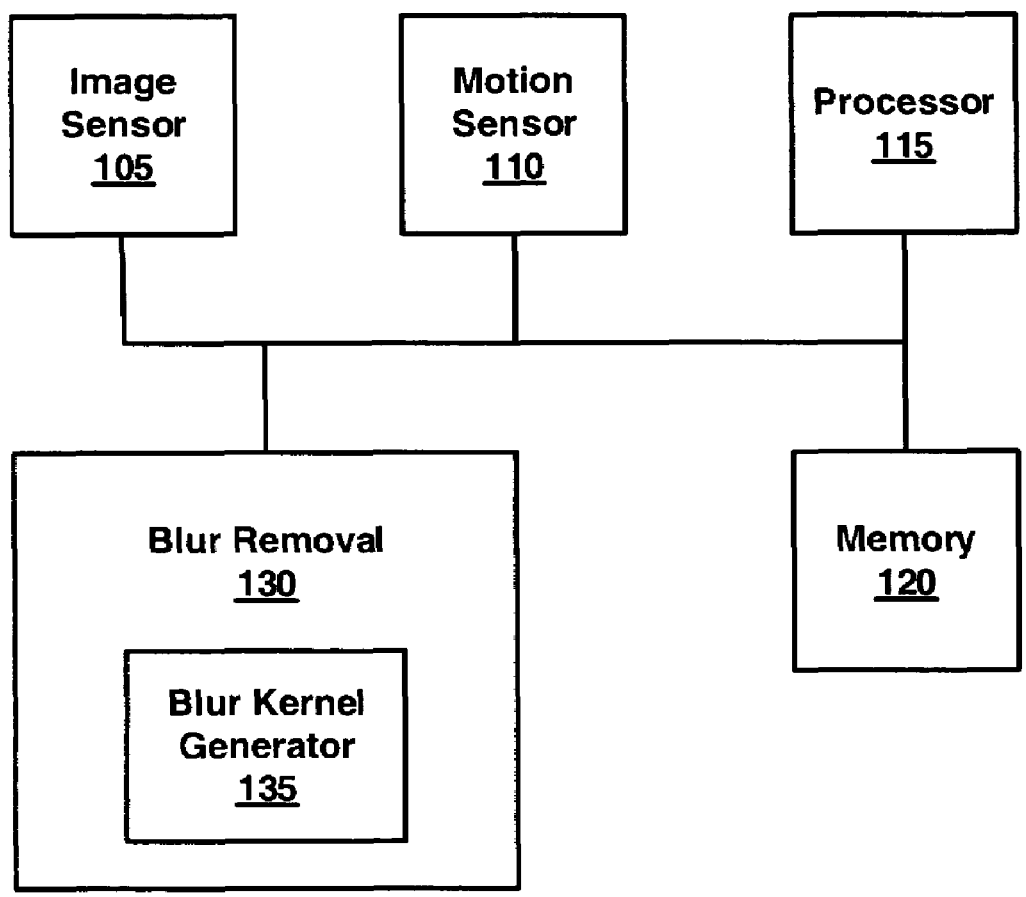
FIG. 1 is a block diagram of a system for deblurring an image based on motion tracking, in accordance with an embodiment of the present invention.

FIG. 1 is a block diagram of a system 100 for deblurring an image based on motion tracking, in accordance with an embodiment of the present invention. In one embodiment, system 100 is comprised within an imaging device. In one embodiment, the imaging device is a digital camera. However, it should be appreciated that the imaging device may be any electronic device that is capable of capturing images in a digital format, e.g., a digital camcorder with a still photo capture function.

System 100 is operable to track the motion of the imaging device. Based on the motion tracked while an image is captured, system 100 generates a blur kernel. The blur kernel may then be used to deblur the image. System 100 provides a sharp image with adequate exposure and reduced blur.

System 100 includes image sensor 105, motion sensor 110, processor 115, memory 120, and blur removal 130. Image sensor 105 is operable to capture images. In one embodiment, image sensor 105 is a pixel array, e.g., a Charge Coupled Device (CCD). However, it should be appreciated that image sensor 105 may be any image sensor for capturing image data, such as a Complementary Metal Oxide Semiconductor (CMOS) image sensor. Captured image data is stored in memory 120. In one embodiment, memory 120 is a memory buffer. It should be appreciated that memory 120 may include computer-usable volatile memory, computer-usable non-volatile memory, and/or a data storage device of the imaging device.

Motion sensor 110 is operable to track and record the motion of the imaging device. In one embodiment, motion sensor 110 tracks and records the motion associated with image sensor 105. In one embodiment, motion sensor 110 includes an angular rate sensor for tracking motion. In another embodiment, motion sensor 110 includes a differential accelerometer for tracking motion. In another embodiment, motion sensor 110 includes a gyroscope for tracking motion. It should be appreciated that motion sensor 110 may be any sensor that is able to track to motion of the imaging device, and is not intended to be limited to the described embodiments.

In one embodiment, motion sensor 110 is operable to track and record the motion of the imaging device during an image exposure. For example, image sensor 105 is exposed to light for a predetermined exposure time (e.g., $\frac{1}{30}$ second). During the exposure, motion sensor 110 periodically records the motion (e.g., every $\frac{1}{300}$ second). The motion is recorded and stored. In one embodiment, the motion is stored in memory 120.

In one embodiment, blur removal 130 includes instructions that are accessible and executable by processor 115. In one embodiment, the instructions are stored in memory 120. In another embodiment, blur removal 130 may include any number and types of volatile and non-volatile storage devices such as RAM, hard disk drives, CD-ROM drives, and DVD drives. In other embodiments, blur removal 130 may include any combination of hardware, software and firmware components configured to perform the functions described herein.

Blur removal 130 is operable to deblur the image captured by image sensor 105. In one embodiment, blur removal 130 includes blur kernel generator 135. System 100 executes blur kernel generator 135 to provide the blur kernel for use in deblurring the image. The blurring process of the image can be modeled as the blur kernel. The blur kernel is generated based on the motion. The pattern of the motion corresponds to how the imaging device was moved during the exposure. In one embodiment, the blur kernel is point spread function that is generated by creating a one-pixel wide trail with a magnitude that is proportional to the portion of the exposure that the imaging device spent at each pixel position. The pattern would be generated by tracking the angular motion of the imaging device in units of pixels.

The image can then be deblurred at blur removal 130 based on the blur kernel. In one embodiment, the image is deblurred by deconvolving the image based on the blur kernel. In one embodiment, Wiener deconvolution is used to deconvolve the image. Wiener deconvolution requires a noise variance estimate associated with image sensor 105 and the capture parameters. In one embodiment, system 100 is operable to estimate the noise variance associated with image sensor 105 and the capture parameters. In one embodiment, the noise variance estimate is stored in memory 120. The noise estimate may be obtained from the data sheet of the technical specifications of image sensor 105 and the capture parameters. The noise estimate is accessible by blur removal 130 in performing Wiener deconvolution. It should also be appreciated that the noise variance can be estimated directly from the image itself.

Figure 2:
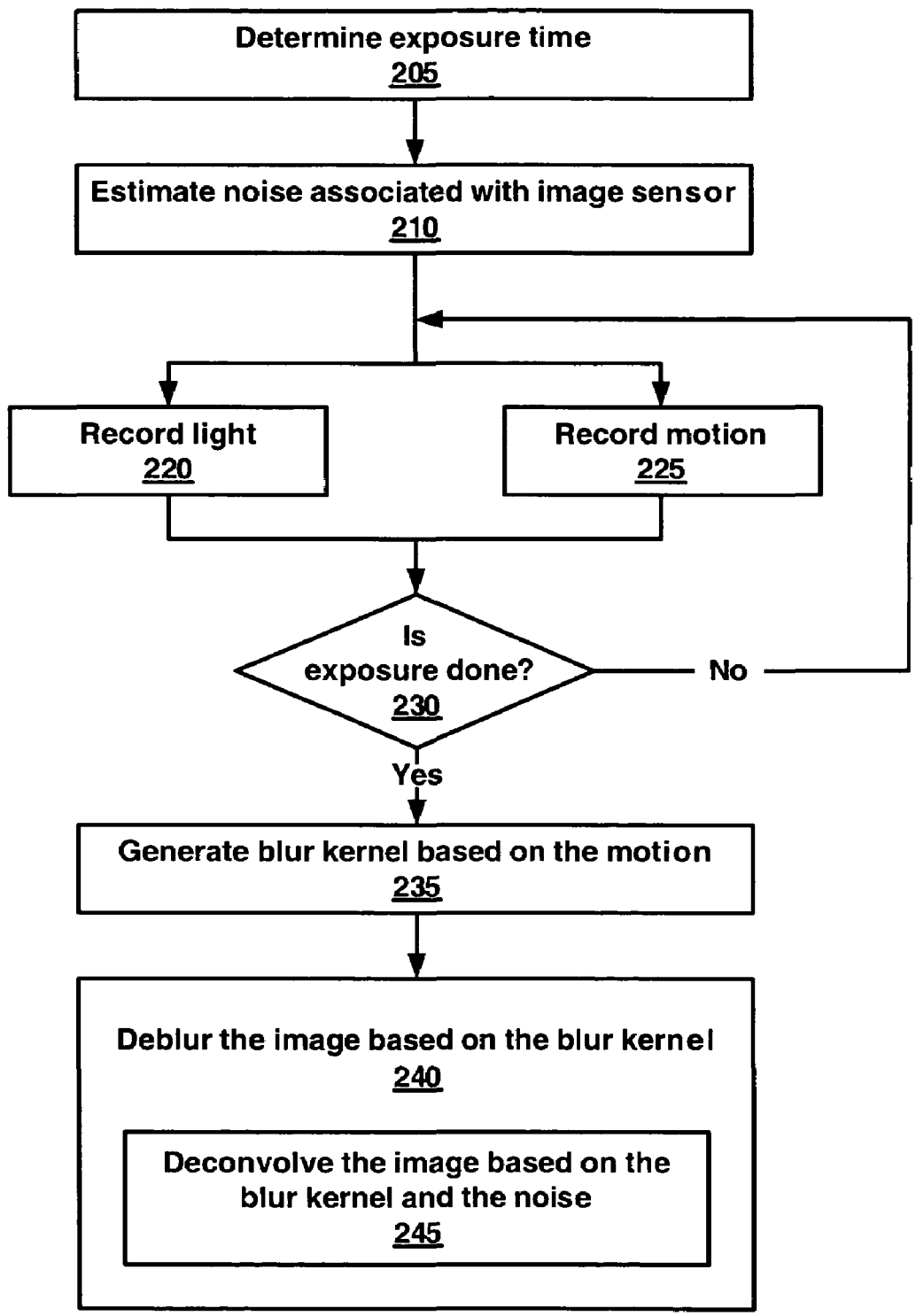
FIG. 2 is a flowchart of a process for deblurring an image based on motion tracking, in accordance with an embodiment of the present invention.

The operation of system 100 is described with reference to FIG. 2. FIG. 2 is a flowchart of a process for deblurring an image based on motion tracking, in accordance with an embodiment of the present invention. In one embodiment, process 200 is carried out by processor 115 under the control of computer-readable and computer-executable instructions (e.g., blur removal 130). The computer-readable and computer-executable instructions reside, for example, in data storage features such as computer usable volatile memory, computer usable non-volatile memory, and/or a data storage device of an imaging device. Although specific steps are disclosed in process 200, such steps are exemplary. That is, the embodiments of the present invention are well suited to performing various other steps or variations of the steps recited in FIG. 2.

At step 205 of process 200, the exposure time for capturing the image is determined. For example, the exposure time may be based on the available light as detected by the imaging device, as well as the optics configuration of the imaging device. The exposure time may also be adjusted based on the zoom and/or aperture sized of the imaging device. For example, a larger zoom or a smaller aperture requires a longer exposure time in order to capture enough light. It should be appreciated that step 205 is optional, and that exposure time may be manually controlled.

At step 210 of process 200, noise associated with the image sensor is estimated. In one embodiment, the noise is estimated by accessing the noise estimate stored on the imaging device (e.g., at memory 130 of FIG. 1). In another embodiment, the noise is estimated by analyzing the image itself. It should be appreciated that step 210 is optional, and is only necessary were deblurring the image is performed using certain types of deconvolution (e.g., Wiener deconvolution).

At step 220, light is recorded at an image sensor (e.g., image sensor 105 of FIG. 1). At step 225, the motion of the imaging device is recorded at a motion sensor (e.g., motion sensor 110 of FIG. 1). In one embodiment, the motion associated with the image sensor is recorded at the motion sensor. It should be appreciated that the motion is tracked and recorded for the duration of the exposure. At step 230, it is determined whether the exposure is done. If the exposure time has not elapsed, process 200 returns to steps 220 and 225, where light and motion are recorded, respectively. Once the exposure time has elapsed, process 200 proceeds to step 235.

In one embodiment, the motion is tracked periodically. For example, consider an exposure time of $\frac{1}{30}$ second, where motion is tracked every $\frac{1}{300}$ second. At step 230, it is determined whether the exposure time of $\frac{1}{30}$ has elapsed. If the exposure has not reached $\frac{1}{30}$ second, process 200 returns to step 225 every $\frac{1}{300}$ second until the exposure time has elapsed. Once the exposure has reached $\frac{1}{30}$ second, the exposure is stopped, and process 200 proceeds to step 235.

At step 235, a blur kernel is generated based on the motion. In one embodiment, the blur kernel is point spread function. At step 240, the image is deblurred based on the blur kernel. In one embodiment, as show at step 245, the image is deblurred by deconvolving the image based on the blur kernel and the noise variance as estimated at step 210. Various optional image enhancements may be performed on the image to deal with non-idealities of the deconvolution of the image. For example, enhancements may be performed to improve the image quality at the peripheries of the image. In one embodiment, it may be assumed that the image is surrounded by a specific color background (e.g., gray or black). In another embodiment, Gaussian windowing may be performed to improve the image quality at the peripheries of the image. These enhancements help to remove sharp discontinuities that can cause artifacts in the image.

Figure 3:
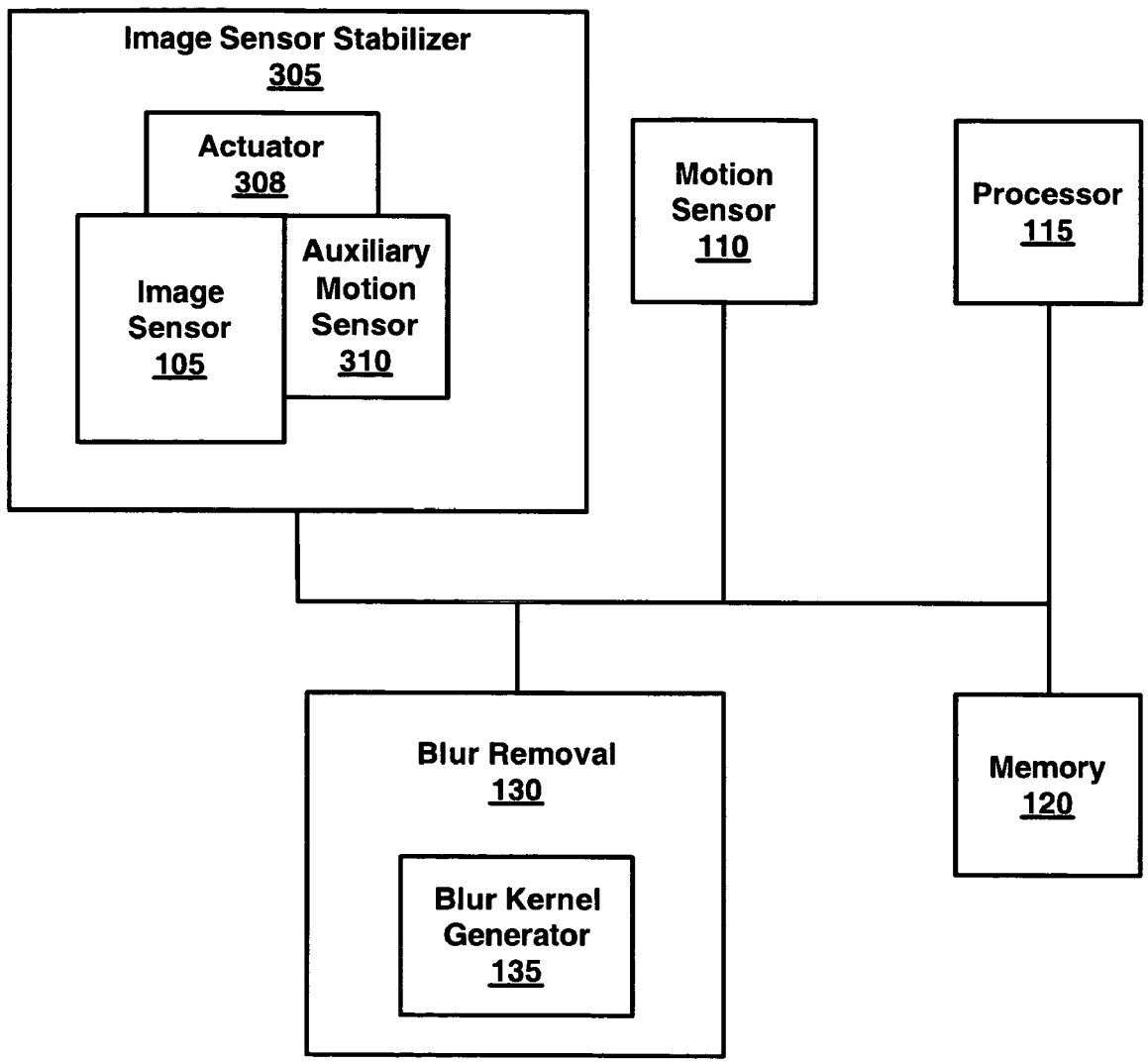
FIG. 3 is a block diagram of a system for deblurring an image based on motion tracking and image stabilization, in accordance with an embodiment of the present invention.

FIG. 3 is a block diagram of a system 300 for deblurring an image based on motion tracking and image stabilization, in accordance with an embodiment of the present invention. In one embodiment, system 300 is comprised within an imaging device. In one embodiment, the imaging device is a digital camera. However, it should be appreciated that the imaging device may be any electronic device that is capable of capturing images in a digital format, e.g., a digital camcorder with a still photo capture function.

System 300 is operable to track the motion of the imaging device. In one embodiment, system 300 is also operable to track the motion of image sensor 105 at auxiliary motion sensor 310. In another embodiment, system 300 is operable to predict the motion of image sensor 105 based on the motion recorded at motion sensor 110 and the properties of the stabilizer (actuator 308). Based on the predicted or actual motion of the image sensor and the motion of the imaging device as recorded by motion sensor 110, corrective measures may be taken by processor 115 to deblur the resulting image.

System 300 includes image sensor 105, image sensor stabilizer 305, motion sensor 110, processor 115, memory 120, and blur removal 130. Image sensor 105, motion sensor 110, processor 115, memory 120, and blur removal 130 operate above as described in conjunction with FIG. 1. Image sensor stabilizer 305 is operable to stabilize image sensor 105 in response to motion as detected by motion sensor 110. In one embodiment, image sensor stabilizer 305 includes a plurality of actuators upon which image sensor 105 resides. In one embodiment, an auxiliary motion sensor 310 resides on image sensor stabilizer 305 such that the actual motion taken by image sensor 105 relative to the imaging device is recorded. In another embodiment, memory 120 includes a prediction module for predicting the motion of image sensor 105 based on the motion recorded at motion sensor 110 and the properties of actuator 308, such that processor 115 is operable to predict the motion of image sensor 105. It should be appreciated that auxiliary motion sensor 310 and the prediction module are optional, and that system 300 only includes one of motion sensor 310 and the prediction module.

In one embodiment, processor 115 is operable to determine whether the image requires deblurring based on the motion recorded by motion sensor 110 and motion sensor 310. For instance, actuator 308 may be subject to mechanical limitations or imperfections in its motion. Therefore, the motion of image sensor stabilizer 305 may not perfectly counteract the motion recorded by motion sensor 110 to correct for motion blur. For example, there may be a lag between the motion detected by motion sensor 110 and the corrective motion of image sensor stabilizer 305. This lag may result in residual motion blur.

In response to motion detected at motion sensor 110, image sensor stabilizer 305 repositions image sensor 105 to counteract the detected motion, stabilizing image sensor 105. Based on the motion tracked while an image is captured, system 300 is operable to stabilize image sensor 105 by repositioning image sensor 105 based on the motion. If image sensor 105 can no longer be tracked due to the mechanical limitations of image sensor stabilizer 305, the image sensor is repositioned such that the motion of image sensor can continue to be tracked and the motion is recorded or predicted. A plurality of images will be superimposed on image sensor 105. System 300 generates a blur kernel based on the displacement of the repositioning at image sensor stabilizer. The blur kernel may then be used to deblur the image. System 300 provides a sharp image with adequate exposure, reducing blur by providing enhanced motion stabilization.

Image sensor stabilizer 305 is only operable to reposition image sensor 105 a certain amount. For instance, image sensor stabilizer 305 is subject to the mechanical limitations of the actuators, which can only be displaced a certain amount. The displacement threshold indicates the amount of displacement of image sensor stabilizer 305 at which image sensor 105 is repositioned (e.g., re-centered). In one embodiment, the displacement threshold is the maximum displacement of image sensor 105 based on the mechanical limitations of image sensor stabilizer 305. In another embodiment, the displacement threshold is less than the mechanical limitations of image sensor stabilizer 305.

Motion sensor 110 is operable to track and record the motion of the imaging device. If the motion not greater than the displacement threshold, image sensor stabilizer 305 repositions image sensor 105 in the opposite direction of the motion and at the same magnitude of the motion. If the motion is greater than the displacement threshold, image sensor stabilizer 305 repositions image sensor 105 such that a subsequent measure of the motion is less than the displacement threshold. In one embodiment, image sensor stabilizer 305 re-centers image sensor 105. Image sensor 105 continues to record light during the repositioning. For a repositioning in response to the motion exceeding the displacement threshold, another image is superimposed on image sensor 105. For example, where the motion exceeds the displacement threshold once, a double-image is recorded at image sensor 105.

Motion sensor 110 is operable to track and record the repositioning of image sensor 105 in response to the motion exceeding the displacement threshold. For example, where the motion exceeds the displacement threshold once, two measures of motion are recorded, one for the original position of image sensor 105, and one accounting for the repositioning of image sensor 105. It should be appreciated that system 300 may reposition image sensor 105 multiple times, to account for larger ranges of motion. This will create a multiple exposure image that has a blur kernel in the form of multiple dots.

Blur removal 130 is operable to deblur the multiple exposure image captured by image sensor 105. In one embodiment, blur removal 130 includes blur kernel generator 135. System 300 executes blur kernel generator 135 to provide the blur kernel for use in deblurring the multiple exposure image. The repositioning of image sensor 105 can be modeled as the blur kernel. The blur kernel is generated based on the motion of image stabilizer and the motion data recorded from the motion sensor. The pattern of the motion corresponds to how image sensor 105 was moved during the exposure. In one embodiment, where the image is a double exposed image, the blur kernel is two points. In another embodiment, where the image is a multiple exposed image, the blur kernel is several points in a line (e.g., a curved line). In one embodiment, the blur kernel is a point spread function that is generated by creating a one-pixel wide trail with a magnitude that is proportional to the portion of the exposure that image sensor 105 spent at each pixel position. The pattern would be generated by tracking the angular motion of the imaging device in units of pixels.

The image can then be deblurred at blur removal 130 based on the blur kernel. In one embodiment, the image is deblurred by deconvolving the image based on the blur kernel. In one embodiment, Wiener deconvolution is used to deconvolve the image. Wiener deconvolution requires a noise estimate associated with image sensor 105. In one embodiment, system 300 is operable to estimate the noise variance associated with image sensor 105. In one embodiment, the noise variance estimate is stored in memory 120. The noise estimate may be obtained from the data sheet of the technical specifications of image sensor 105. The noise variance estimate is accessible by blur removal 130 in performing Wiener deconvolution.

Figure 4A:
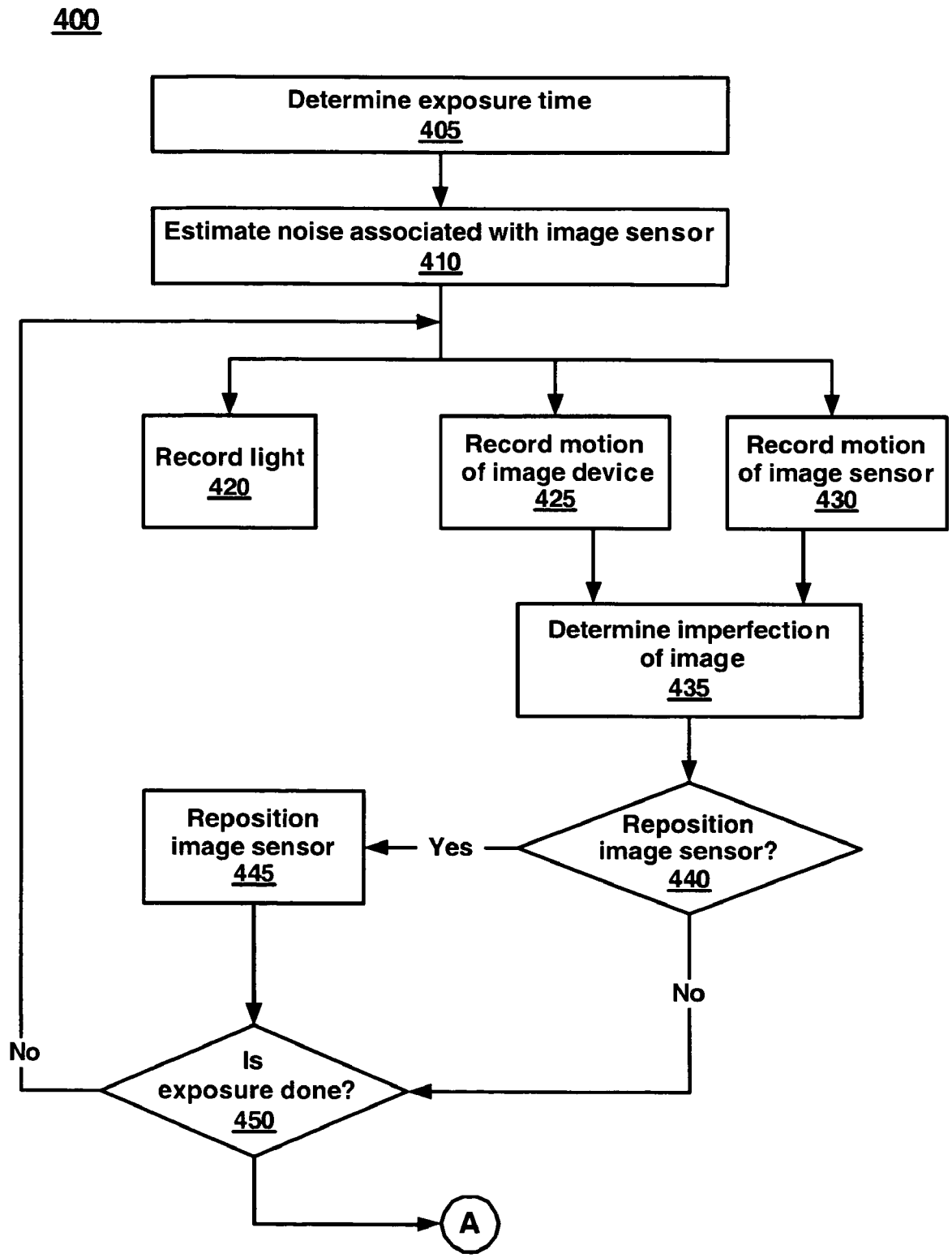
FIGS. 4A and 4B are a flowchart of a process for deblurring an image based on motion tracking and image stabilization, in accordance with an embodiment of the present invention.
Figure 4B:
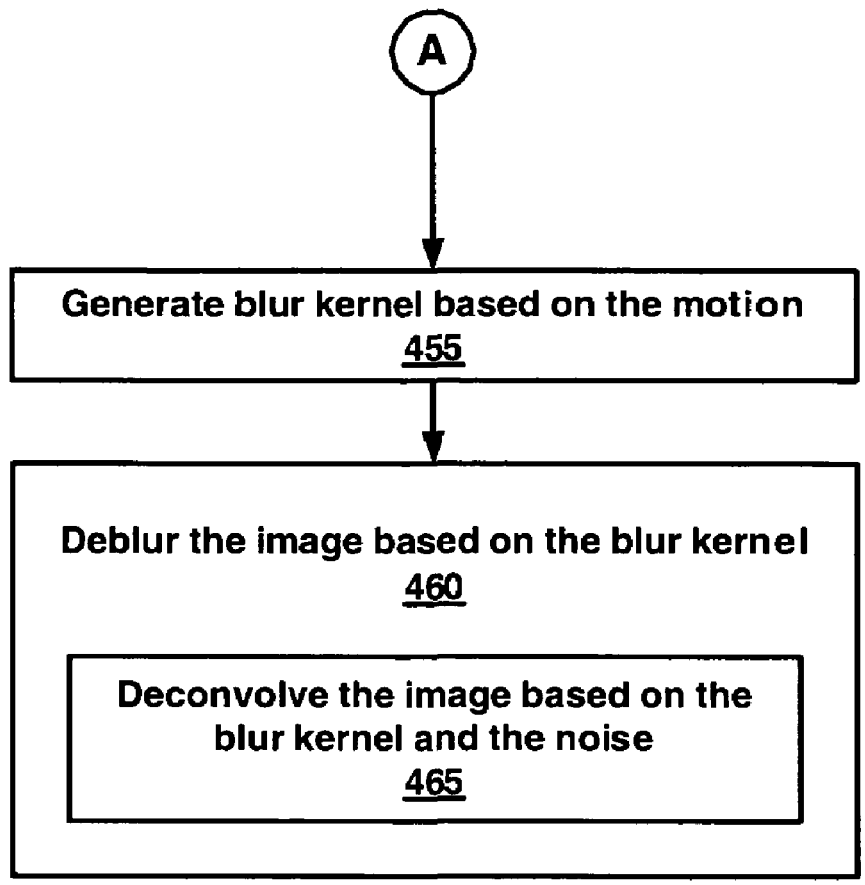

The operation of system 300 is described with reference to FIGS. 4A and 4B. FIGS. 4A and 4B are a flowchart of a process for deblurring an image based on motion tracking and image stabilization, in accordance with an embodiment of the present invention. In one embodiment, process 400 is carried out by processor 115 under the control of computer-readable and computer-executable instructions (e.g., blur removal 130). The computer-readable and computer-executable instructions reside, for example, in data storage features such as computer usable volatile memory, computer usable non-volatile memory, and/or a data storage device of an imaging device. Although specific steps are disclosed in process 400, such steps are exemplary. That is, the embodiments of the present invention are well suited to performing various other steps or variations of the steps recited in FIGS. 4A and 4B.

At step 405 of process 400, the exposure time for capturing the image is determined. For example, the exposure time may be based on the available light as detected by the imaging device, as well as the optics configuration of the imaging device. The exposure time may also be adjusted based on the zoom and/or aperture sized of the imaging device. For example, a larger zoom or a smaller aperture requires a longer exposure time in order to capture enough light. It should be appreciated that step 405 is optional, and that exposure time may be manually controlled.

At step 410 of process 400, noise variance associated with the image sensor is estimated. In one embodiment, the noise variance is estimated by accessing the noise estimate stored on the imaging device (e.g., at memory 130 of FIG. 3). It should be appreciated that step 410 is optional, and is only necessary were deblurring the image is performed using certain types of deconvolution (e.g., Wiener deconvolution).

At step 420, light is recorded at an image sensor (e.g., image sensor 105 of FIG. 3). At step 425, the motion of the imaging device is recorded at a first motion sensor (e.g., motion sensor 110 of FIG. 3) and at step 430 the motion of the image sensor is recorded. In one embodiment, the actual motion of the image sensor is recorded at a second auxiliary motion sensor (e.g., motion sensor 310 of FIG. 3). In another embodiment, the motion of the image sensor is modeled according to a prediction module of the image sensor stabilizer. Using the technical specifications of the actuator 308, the motion of the image sensor can be modeled based on the motion of the imaging device. In one embodiment, the motion associated with the image sensor is recorded at the second motion sensor. The first measure of motion indicates the initial position of the image sensor. It should be appreciated that the motion is tracked and recorded for the duration of the exposure.

At step 435, any imperfection of debluring process is determined. In one embodiment, the imperfection is based on a difference between the motion recorded by the first motion sensor and the motion recorded by the second motion sensor. In one embodiment, the image requires deblurring due to motion blur caused by limitations or imperfections in the motion of the image stabilizer on which the image sensor resides (e.g., image sensor stabilizer 305 of FIG. 3).

In another embodiment, as shown at optional step 440, the image sensor requires repositioning if the motion detected at the second motion sensor exceeds the displacement threshold of the actuator. If the motion is greater than the displacement threshold, as shown at optional step 445, the image sensor stabilizer repositions the image sensor. The image sensor is repositioned such that a subsequent measure of motion is not greater than the displacement threshold. In one embodiment, the image center is re-centered on the image sensor stabilizer. Process 400 then proceeds to step 450. The displaced position of the image sensor is recorded.

At step 450, it is determined whether the exposure is done. If the exposure time has not elapsed, process 400 returns to steps 420, 425 and 430. With respect to repositioning the image sensor, it should be appreciated that if the motion is not greater than the displacement threshold, the image sensor may be repositioned. However, the motion is only recorded if the motion is greater than the displacement threshold. The motion is only recorded to account for multiple images captured at the image sensor. If the displacement threshold is not exceeded, the image sensor effectively accounts for image blur, and another image is not recorded at the image sensor, so there is no need to record the motion.

Once the exposure time has elapsed, process 400 proceeds to step 455. At step 455, a blur kernel is generated based on the recorded motion. In one embodiment, the blur kernel is point spread function. At step 460, the image is deblurred based on the blur kernel. In one embodiment, as show at step 465, the image is deblurred by deconvolving the image based on the blur kernel and the noise as estimated at step 410. Various optional image enhancements may be performed on the image to deal with non-idealities of the deconvolution of the image. For example, enhancements may be performed to improve image quality at the peripheries of the image. In one embodiment, it may be assumed that the image is surrounded by a specific color background (e.g., gray or black). In another embodiment, Gaussian windowing may be performed to improve image quality at the peripheries of the image. These enhancements help to avoid sharp discontinuities that can cause artifacts such as ringing artifact in the image.

In summary, in its various embodiments, the present invention provides for deblurring an image. In one embodiment, the motion of the imaging device is recorded. A blur kernel is generated based on the motion. The image is then deblurred based on the blur kernel. In another embodiment, motion stabilization is used to stabilize the image sensor. In one embodiment, based on the motion of the imaging device and the predicted or actual motion of the image sensor, the image may be deblurred. In another embodiment, if the motion exceeds the displacement threshold of the image sensor stabilizer, the motion is recorded and the image sensor is repositioned. A blur kernel is generated based on the recorded motion. The image is then deblurred based on the blur kernel. In other words, the described invention provides for deblurring an image based on the recorded motion and for providing enhanced motion stabilization based on the recorded motion.

Various embodiments of the present invention, a method and system for deblurring an image based on motion tracking, are described herein. While the present invention has been described in particular embodiments, it should be appreciated that the present invention should not be construed as limited by such embodiments, but rather construed according to the following claims.

What is claimed is:

1. A method for deblurring an image based on motion tracking, said method comprising:
   recording light at an image sensor of an imaging device to capture an image;
   recording motion of said imaging device at a motion sensor of said imaging device during said recording said light at said image sensor; and
   generating a blur kernel based on said motion
   further comprising deblurring said image based on said blur kernel;
   wherein said deblurring said image based on said blur kernel comprises deconvolving said image based on said blur kernel;
   recording motion of said image sensor during said recording said light at said image sensor; and
   determining an imperfection between said motion of said image sensor and said motion of said imaging device.

2. The method as recited in claim 1 further comprising estimating noise of said image.

3. The method as recited in claim 2 wherein said deconvolving said image comprises performing a Wiener deconvolution on said image based on said blur kernel and said noise.

4. The method as recited in claim 1 wherein said recording said motion is performed periodically during said recording said light at said image sensor.

5. The method as recited in claim 1 wherein said blur kernel is a point spread function.

6. The method as recited in claim 1 further comprising:
   determining whether a measure of said motion of said image sensor is greater than a displacement threshold; and
   if a measure of said motion is greater than a displacement threshold, repositioning said image sensor such that a subsequent measure of said motion is not greater than said displacement threshold.

7. The method as recited in claim 6 wherein said displacement threshold is associated with a maximum displacement of said image sensor.

8. The method as recited in claim 6 wherein said image is a double-exposed image and wherein said blur kernel comprises at least two points.

9. The method as recited in claim 1 wherein said recording motion of said image sensor is performed at a second motion sensor of said imaging device.

10. The method as recited in claim 1 wherein said recording motion of said image sensor is performed using a prediction module of said motion of said image sensor based on motion of said imaging device.

11. An imaging system comprising:
   an image sensing means for recording light to capture an image;
   a motion sensing means for recording motion of said imaging system during said capture of said image;
   a memory means for storing said image and said motion; and
   a processing means for generating a blur kernel based on said motion
   wherein said processing means is also for deblurring said image based on said blur kernel;
   wherein said processing means is operable to deblur said image by deconvolving said image based on said blur kernel;
   a second motion sensing means for recording motion of said image sensing means during said capture of said image; and
   imperfection determination means for determining an imperfection between said motion of said imaging system and said motion of said image sensing means.

12. The imaging system as recited in claim 11 wherein said processing means is also for estimating noise of said image.

13. The imaging system as recited in claim 12 wherein said deconvolving is performed using a Wiener deconvolution based on said blur kernel and said noise.

14. The imaging system as recited in claim 11 wherein said motion sensing means is operable to periodically record said motion during said capture of said image.

15. The imaging system as recited in claim 11 wherein said blur kernel is a point spread function.

16. The imaging system as recited in claim 11 further comprising:
   means for determining whether a measure of said motion of said image sensing means is greater than a displacement threshold; and
   means for repositioning said image sensor if a measure of said motion is greater than a displacement threshold such that a subsequent measure of said motion is not greater than said displacement threshold.

17. The imaging system as recited in claim 16 wherein said displacement threshold is associated with a maximum displacement of said image sensing means.

18. The imaging system as recited in claim 16 wherein said image is a double-exposed image and wherein said blur kernel comprises at least two points.

19. The imaging system as recited in claim 11 wherein said second motion sensing means comprises a motion sensor.

20. The imaging system as recited in claim 11 wherein said second motion sensing means comprises a prediction module of said motion of said image sensing means based on motion of said imaging system.

21. A computer-usable medium having computer-readable program code embodied therein for causing a computer system to perform a method for deblurring an image based on motion tracking, said method comprising:
   recording light at an image sensor of an imaging device to capture an image;
   recording motion of said image sensor at a motion sensor of said imaging device during said recording said light at said image sensor; and
   generating a blur kernel based on said motion
   further comprising deblurring said image based on said blur kernel;
   wherein said deblurring said image based on said blur kernel comprises deconvolving said image based on said blur kernel;
   recording motion of said image sensor during said recording said light at said image sensor; and
   determining an imperfection between said motion of said image sensor and said motion of said imaging device.

22. The computer-usable medium as recited in claim 21 wherein said method further comprises:
   determining whether a measure of said motion of said image sensor is greater than a displacement threshold; and
   if a measure of said motion is greater than a displacement threshold, repositioning said image sensor such that a subsequent measure of said motion is not greater than said displacement threshold.

* * * * *